United States Patent [19]
Sach

[11] 3,760,215
[45] Sept. 18, 1973

[54] LOW-REFLECTION FILTER FOR CATHODE RAY TUBE FACE PLATE

[75] Inventor: Gary M. Sach, Orange, Calif.

[73] Assignee: The United States of America as represented by the Secretary of the Navy, Washington, D.C.

[22] Filed: Aug. 22, 1972

[21] Appl. No.: 282,741

[52] U.S. Cl............. 313/92 R, 178/7.82, 178/7.85, 313/112, 350/276 R
[51] Int. Cl............................................... H01j 5/16
[58] Field of Search.......................... 313/92 R, 112; 350/276 R; 178/7.82, 7.85

[56] References Cited
UNITED STATES PATENTS
| | | | |
|---|---|---|---|
| 2,958,801 | 11/1960 | Herriott | 313/92 R |
| 3,048,729 | 8/1962 | Perry | 313/92 R |
| 3,576,356 | 4/1971 | Hyman et al. | 313/112 X |

*Primary Examiner*—Roy Lake
*Assistant Examiner*—Siegfried H. Grimm
*Attorney*—R. S. Sciascia et al.

[57] ABSTRACT

The invention consists of a filter for the display screen of a cathode-ray tube (CRT). The filter permits a high contrast ratio to be obtained for operation of a CRT in intense ambient light and comprises a faceplate sandwich bonded to the viewing side of the phosphor coated CRT glass. The filter includes two layers of tempered glass, having a circular polarizer sandwiched between them. The layer of tempered glass attached to the CRT glass is covered with a conductive, neutral density, specular-reflective, filter coating. The filter coating may be connected to a conductive annular ring, which ring surrounds the other piece of tempered glass. This connection serves the dual purpose of providing an RFI shield and a Faraday shield.

9 Claims, 2 Drawing Figures

PATENTED SEP 18 1973    3,760,215

LOW-REFLECTION FILTER FOR CATHODE RAY TUBE FACE PLATE

BACKGROUND OF THE INVENTION

The present invention relates generally to screens for cathode-ray tubes and more particularly to a screen structure for improving image contrast. Video displays, such as those on cathode-ray tubes, must often be viewed in an environment of high ambient light. The ambient light reflects from the display screen and degrades the contrast of the displayed image. This phenomenon is noticably present on a television display when viewed in the daylight. The undesirable effect is even more pronounced when a pilot attempts to view a radar display located in the cockpit of an airplane directly exposed to sunlight.

DESCRIPTION OF THE PRIOR ART

Various methods are employed to reduce this contrast-destroying reflection of ambient light. Many of these methods employ combinations of light filters to prevent the reflective light from passing back through the screen. Another method for reducing reflection and thus increasing contrast employs a light absorbing material on the back of the florescent material.

SUMMARY OF INVENTION

The invention primarily consists of a faceplate sandwich bonded to the display screen. The sandwich attenuates light by initially polarizing the light en route to the CRT and causing it to encounter destructive interference upon reflection. Additionally, the faceplate sandwich provides an RFI shield over the CRT and, when used with a multi-mode storage tube, functions as a Faraday shield. The latter shield is necessary during multi-mode storage tube operation, since the view screen is being pulsed with high voltage rather than having a steady voltage applied at all times.

OBJECTS OF THE INVENTION

An object of the present invention is to isolate the operator from the CRT should implosion occur.

Another object is to improve contrast enhancement between image and background radiation by the reduction of specular reflection in high ambient light.

A further object of the invention is the provision of an edge-lit plotting surface on a filter for a CRT for low ambient light conditions.

Still another object is to provide both an RFI and Faraday shield over the CRT.

Other objects, advantages, and novel features of the present invention will become apparent from the following detailed description of the invention when considered in conjunction with the accompanying drawings.

DESCRIPTION OF THE PREFERRED EMBODIMENTS

Figure 1:
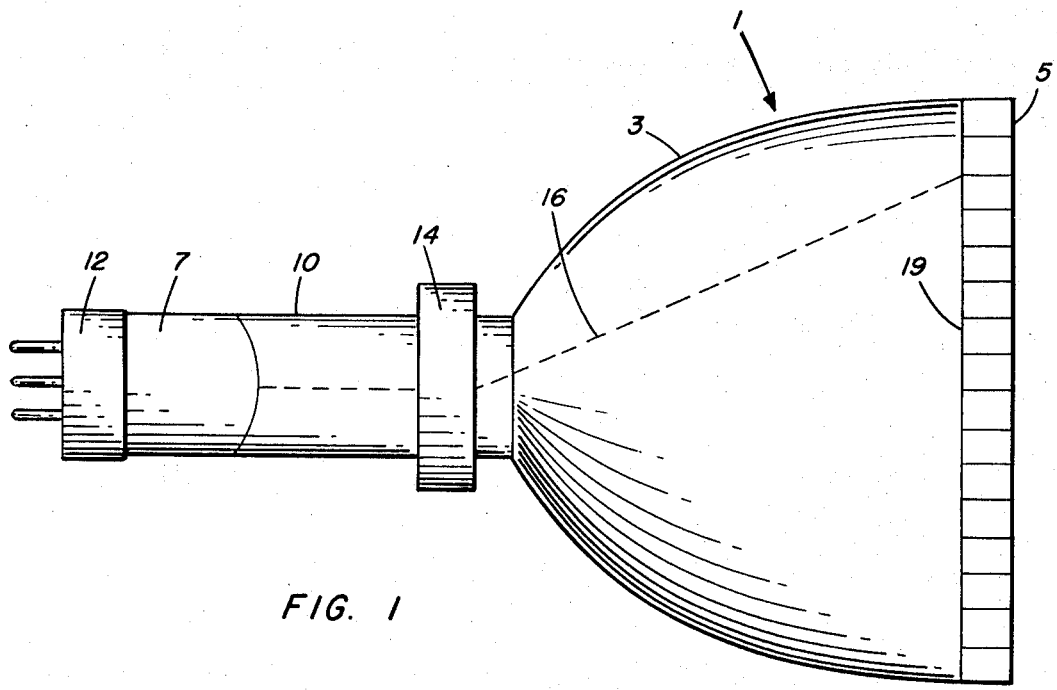
FIG. 1 is a schematic view of a display apparatus in accordance with the invention.

FIG. 1, which illustrates a preferred embodiment of the display apparatus, shows a cathode-ray tube indicated generally at 1. The CRT consist of an evacuated envelope 3 having a glass display screen and filter schematically represented at 5 mounted on one end. An electron gun 7 is typically mounted in the neck portion 10 of the tube 1. The neck is sealed by a tube socket 12 having pins for connection to energizing circuitry. Deflection means 14, for example a magnetic deflection yoke, is mounted on the neck 10 and employed to scan the electron beam 16 produced by gun 7 across the display screen 5.

Figure 2:
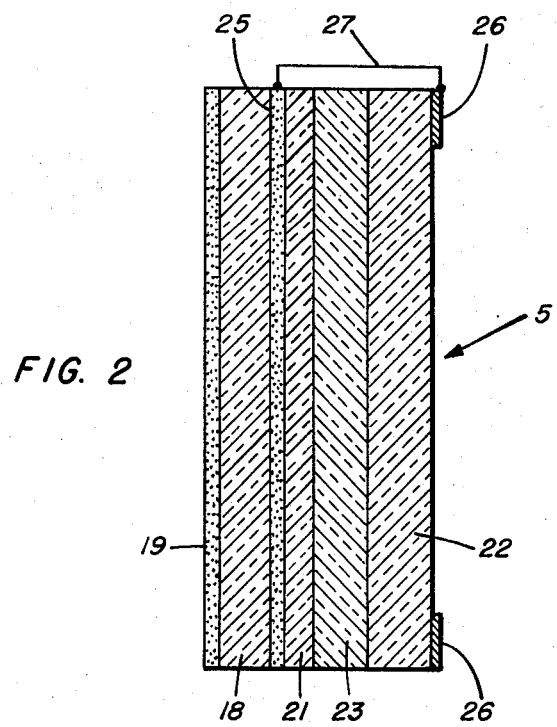
FIG. 2 is an enlarged view of the display screen and filter portion of the apparatus of FIG. 1.

An enlarged view of the display screen and filter is shown in FIG. 2. The display screen and filter 5 consist of the normal faceplate 18 having a phosphor coating 19 thereon. Broadband green phosphors such as (Zn,Cd)S:Cu may be employed as well as narrow-band green-emitting phosphors, such as LaOCL:Tb. The above phosphors are only examples, and others of various colors may be employed.

A filter sandwich consisting of two pieces of tempered glass 21 and 22 having a circular polarizer 23 interposed between them is bonded to faceplate 18. The first piece of glass 21 has a neutral-density, specular-reflecting, conductive coating 25. The coating 25 is connected to an annular conductive ring 26 surrounding the second piece of glass 22 by a conductive bus schematically illustrated at 27. The second piece of glass 22 may be covered with a commercially available high efficiency anti-reflection coating.

The faceplate filter functions as follows. Ambient light is circularly polarized en route to the CRT faceplate 18. Depending on the filter coating on tempered glass plate 21, a certain percentage of the polarized light is reflected and meets destructive interference when it passes through the circular polarizer 23 for the second time. The same destructive interference is encountered by the light that passes through the filter coating 25 and is specularly reflected by the CRT. Light generated by the phosphor 19 is initially unpolarized and is attenuated by an amount depending on the type of filter coating on tempered glass 21. Moreover, as it passes through the circular polarizer 23, the light again is partially attenuated (37 percent), but does not encounter destructive interference. Glass plate 22, being clear, allows the front surface of the faceplate sandwich 5 to be illuminated be edge-lighting, thus providing a plotting surface in low ambient light. Furthermore, glass plate 22 serves as an implosion shield.

The conductive coating on glass plate 21, being connected to a conductive annular ring 26 on glass plate 22, provides an RFI shield on the CRT and, when used with a multimode storage tube, provides a Faraday shield. The faceplate filter generally may be employed for any CRT application. The contrast enhancement capabilities of the faceplate can be optimized for different applications by changing the transmission characteristics of the filter coating. Although INCONEL has been employed as a filter coating with great success, any coating meeting the above listed specifications may be used.

Obviously many modifications and variations of the present invention are possible in light of the above teachings. It is therefore to be understood that, within the scope of the appended claims, the invention may be practiced otherwise than as specifically described.

What is claimed is:

1. A filter for use on a cathode-ray tube display screen, said filter comprising:

first and second sheets of tempered glass, the first sheet having a specular-reflecting, conductive, neutral-density coating thereon; and a circular polarizer interposed between said first and second sheets of tempered glass.

2. The filter of claim 1 wherein said coating is INCONEL.

3. The filter of claim 1 further including a conductive, annular ring surrounding the second sheet of tempered glass and a conductive bus connecting said ring to said coating.

4. The filter of claim 3 wherein said first and second sheets and said circular polarizer are bonded together to form a filter sandwich.

5. The filter of claim 4 wherein the second sheet of tempered glass has an anti-reflection coating thereon.

6. A high-contrast display apparatus adapted for viewing in an environment of bright ambient light comprising:

a cathode-ray tube having a screen coated with fluorescent material:

a sheet of tempered glass coated with a neutral-density, specular-reflecting, conductive material, said sheet of tempered glass being bonded to said screen;

a circular polarizer having one side bonded to said sheet of tempered glass; and a second sheet of tempered glass bonded to the other side of said circular polarizer.

7. The display apparatus of claim 6 wherein the coating on the first sheet of tempered glass is INCONEL.

8. The display apparatus of claim 6 wherein a conductive ring surrounds said second sheet of tempered glass and a bus connects said ring with the coating on the first sheet of tempered glass to provide an RFI and Faraday shield for said apparatus.

9. The display apparatus of claim 6 wherein both sheets of tempered glass and the circular polarizer are flat.

* * * * *